(12) United States Patent
Oo et al.

(10) Patent No.: US 9,171,370 B2
(45) Date of Patent: Oct. 27, 2015

(54) METHOD, AN APPARATUS AND A COMPUTER PROGRAM PRODUCT FOR DEINTERLACING AN IMAGE HAVING A PLURALITY OF PIXELS

(75) Inventors: Zaw Min Oo, Singapore (SG); Kok Seng Aw, Singapore (SG); Kwong Huang Goh, Singapore (SG); Jo Yew Tham, Singapore (SG); Wei Siong Lee, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 207 days.

(21) Appl. No.: 13/879,686

(22) PCT Filed: Oct. 20, 2011

(86) PCT No.: PCT/SG2011/000364
§ 371 (c)(1),
(2), (4) Date: Jun. 24, 2013

(87) PCT Pub. No.: WO2012/053978
PCT Pub. Date: Apr. 26, 2012

(65) Prior Publication Data
US 2013/0287315 A1    Oct. 31, 2013

Related U.S. Application Data

(60) Provisional application No. 61/394,794, filed on Oct. 20, 2010.

(51) Int. Cl.
*G06K 9/40* (2006.01)
*G06T 7/00* (2006.01)
*H04N 7/01* (2006.01)
*H04N 5/14* (2006.01)

(52) U.S. Cl.
CPC .............. *G06T 7/0022* (2013.01); *H04N 5/144* (2013.01); *H04N 7/012* (2013.01)

(58) Field of Classification Search
None
See application file for complete search history.

(56) References Cited

U.S. PATENT DOCUMENTS

| | | | | | |
|---|---|---|---|---|---|
| 4,626,891 | A | * | 12/1986 | Achiha | 348/702 |
| 5,204,741 | A | * | 4/1993 | Sakaguchi | 348/208.6 |
| 5,929,935 | A | * | 7/1999 | Young et al. | 348/607 |
| 5,943,036 | A | * | 8/1999 | Tanaka | 345/620 |
| 8,593,572 | B2 | * | 11/2013 | Nix et al. | 348/452 |
| 2002/0021826 | A1 | * | 2/2002 | Okuda | 382/107 |
| 2002/0105596 | A1 | * | 8/2002 | Selby | 348/699 |
| 2003/0218621 | A1 | * | 11/2003 | Jiang | 345/698 |

(Continued)

OTHER PUBLICATIONS

International Preliminary Report on Patentability for International Application No. PCT/SG2011/000364 dated May 2, 2013.

(Continued)

*Primary Examiner* — Sean Motsinger
(74) *Attorney, Agent, or Firm* — Winstead, P.C.

(57) ABSTRACT

According to example embodiments, a method for deinterlacing an image having a plurality of pixels, the method comprising: calculating a difference between a first pixel of the image and each pixel of at least one pixel pair, each pixel pair comprising one pixel being positioned above the first pixel and another pixel being positioned below the first pixel; and deinterlacing the first pixel only if at least one difference corresponding to a pixel pair exceeds a predefined threshold. A corresponding apparatus and computer program product are also provided.

14 Claims, 14 Drawing Sheets

(56) References Cited

U.S. PATENT DOCUMENTS

| | | | |
|---|---|---|---|
| 2004/0263685 A1* | 12/2004 | Song | 348/452 |
| 2005/0225564 A1* | 10/2005 | Shan | 345/606 |
| 2005/0225672 A1* | 10/2005 | Lufkin | 348/448 |
| 2006/0158531 A1* | 7/2006 | Yanof | 348/226.1 |
| 2006/0285010 A1* | 12/2006 | Wang et al. | 348/452 |
| 2007/0091205 A1* | 4/2007 | MacInnis et al. | 348/448 |
| 2007/0200950 A1 | 8/2007 | Bae | |
| 2008/0181517 A1* | 7/2008 | Aokage | 382/236 |
| 2009/0167911 A1* | 7/2009 | Takane | 348/296 |
| 2010/0026862 A1* | 2/2010 | Nishiwaki | 348/246 |
| 2013/0002957 A1* | 1/2013 | Deng et al. | 348/584 |
| 2013/0287315 A1* | 10/2013 | Oo et al. | 382/284 |

OTHER PUBLICATIONS

International Search Report for International Application No. PCT/SG2011/000364 dated Jan. 16, 2012.

Written Opinion of the International Searching Authority for International Application No. PCT/SG2011/000364 dated Jan. 11, 2012.

* cited by examiner (a)

(b)

(a)

(b)

(a)   (b)

| | LA | LD | VTMed | STMed | ELA | Embodiment under test |
|---|---|---|---|---|---|---|
| Average number of frames processed per second | 98 | 100 | 56 | 30 | 56 | 85 |

FIGURE 14

METHOD, AN APPARATUS AND A COMPUTER PROGRAM PRODUCT FOR DEINTERLACING AN IMAGE HAVING A PLURALITY OF PIXELS

CROSS-REFERENCE TO RELATED APPLICATION

The present application is a U.S. National Stage Application under 35 U.S.C. §371 of International Application No. PCT/SG2011/000364, filed on 20 Oct. 2011, the complete disclosure of which is incorporated herein by reference. This application claims priority from U.S. provisional patent application No. 61/394,794, filed 20 Oct. 2010, the content of it being hereby incorporated by reference in its entirety for all purposes.

TECHNICAL FIELD

Various embodiments relate to a method for deinterlacing, an apparatus for deinterlacing and a computer program product for deinterlacing. In various embodiments, the method, apparatus and computer program product relate to deinterlacing an image having a plurality of pixels.

BACKGROUND

Interlace video cameras capture scenes as fields instead of frames. A field is half the vertical width (i.e. height) of a frame. A frame is composed of two fields. A frame of an interlaced video sequence is formed by combining alternate lines of a pair of fields.

Interlacing was originally designed for cathode ray tube (CRT) displays in which phosphor glows to illuminate the screen. One reason why interlacing works well on CRT displays is that human beings notice details flickering less than mass flickering. Nowadays, CRT displays are being replaced by displays having newer technologies, such as, for example, liquid crystal displays (LCD) and plasma displays. Both LCD and plasma displays use progressive scanning or frames as inputs, rather than fields.

To display a pair of two adjacent interlace fields as a progressive full frame, the fields must be combined together. However, the interlace fields are captured sequentially and, therefore, at slightly different times. Accordingly, vertical and diagonal structures or edges distort if the camera or the subject moves in-between the first and second fields being captured. This results in visually discernable artifacts (i.e. distortions) occurring when the two fields are combined together into a single frame. Exemplary artifacts, known as interlacing (or combing) artifacts, are shown in FIG. 1. FIG. 1(a) illustrates some signage, wherein interlacing artifacts can be clearly seen at the edges between the pale lettering of 'FOST' and the darker background behind. FIG. 1(b) illustrates a person pointing, wherein interlacing artifacts can be clearly seen at the edges between the pale post to the right of the person and the darker background behind. In addition to degrading image quality, the interlacing artifacts can reduce the coding efficiency of video encoders.

De-interlacing is a mechanism to remove or reduce as many interlacing artifacts as possible when two fields are combined into a frame. As interlacing artifacts are removed, visual quality and coding efficiency of the frame may be improved.

SUMMARY

Various embodiments provide, a method for deinterlacing an image having a plurality of pixels, the method comprising: calculating a difference between a first pixel of the image and each pixel of at least one pixel pair, each pixel pair comprising one pixel being positioned above the first pixel and another pixel being positioned below the first pixel; and deinterlacing the first pixel only if at least one difference corresponding to a pixel pair exceeds a predefined threshold.

Various embodiments provide, an apparatus for deinterlacing an image having a plurality of pixels, the apparatus comprising: at least one processor; and at least one memory including computer program code; the at least one memory and the computer program code being configured, with the at least one processor, to cause the apparatus to perform at least the following: calculate a difference between a first pixel of the image and each pixel of at least one pixel pair, each pixel pair comprising one pixel being positioned above the first pixel and another pixel being positioned below the first pixel; and deinterlace the first pixel only if at least one difference corresponding to a pixel pair exceeds a predefined threshold.

Various embodiments provide, a computer program product for deinterlacing an image having a plurality of pixels, the computer program product comprising at least one computer-readable storage medium having computer-executable program code instructions stored therein, the computer-executable program code instructions comprising: program code for calculating a difference between a first pixel of the image and each pixel of at least one pixel pair, each pixel pair comprising one pixel being positioned above the first pixel and another pixel being positioned below the first pixel; and program code for deinterlacing the first pixel only if at least one difference corresponding to a pixel pair exceeds a predefined threshold.

BRIEF DESCRIPTION OF THE DRAWINGS

In the drawings, like reference characters generally refer to like parts throughout the different views. The drawings are not necessarily to scale, emphasis instead generally being placed upon illustrating the principles of some example embodiments of the invention. In the following description, various example embodiments of the invention are described with reference to the following drawings, in which:

FIGS. 8 to 14 illustrate simulation results relating to a first set of experiments;

DETAILED DESCRIPTION

Figure 1:
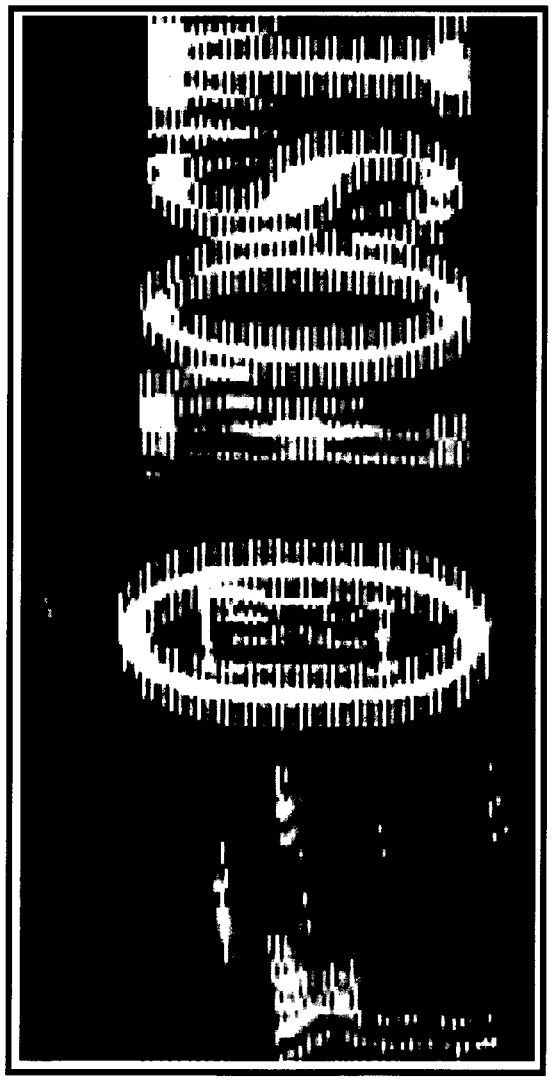
FIG. 1 illustrates two examples of interlacing artifacts.
Figure 1:
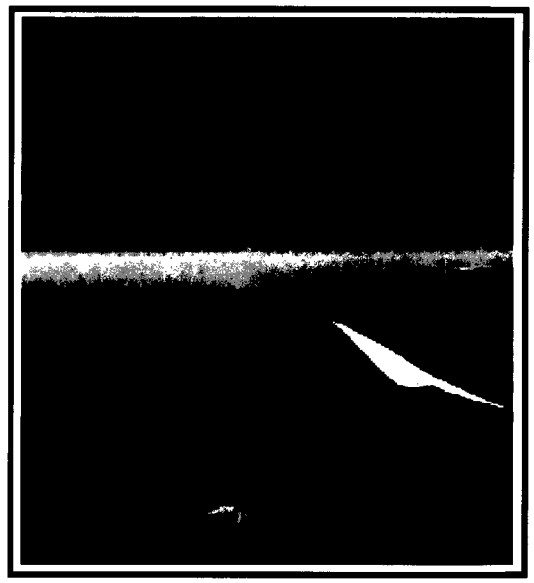

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Various embodiments provide, a method for deinterlacing an image having a plurality of pixels, the method comprising: calculating a difference between a first pixel of the image and each pixel of at least one pixel pair, each pixel pair comprising one pixel being positioned above the first pixel and another pixel being positioned below the first pixel; and deinterlacing the first pixel only if at least one difference corresponding to a pixel pair exceeds a predefined threshold.

Preferably, the first pixel is deinterlaced only if both differences corresponding to the pixel pair exceed the predefined threshold.

Preferably, the first pixel is deinterlaced only if both differences corresponding to the pixel pair exceed the predefined threshold and have matching signs.

Preferably, the first pixel is deinterlaced only if both differences corresponding to another pixel pair exceed the predefined threshold and have matching signs.

Preferably, deinterlacing comprises setting the first pixel to equal an average value, the average value being calculated using both differences which exceed the predefined threshold and have matching signs.

Preferably, the at least one pixel pair comprises a plurality of pixel pairs, the plurality of pixel pairs having a predefined order, and the method being performed in respect of each pixel pair sequentially and in accordance with the predefined order.

Preferably, according to the predefined order, the method is performed in respect of a pixel pair which is vertically aligned with the first pixel before the method is performed in respect of a pixel pair which is diagonally aligned with the first pixel.

Preferably, the image is a frame of a video and, if deinterlacing is not performed, the method further comprises: detecting motion in respect of the first pixel by comparing the first pixel with a corresponding pixel of at least one other frame of the video; and deinterlacing the first pixel only if motion is detected in respect of the first pixel.

Preferably, motion is detected if a difference between the first pixel and the corresponding pixel of the at least one other frame exceeds a second predefined threshold.

Preferably, at least one pixel of a pixel pair is positioned adjacent to the first pixel.

Preferably, the first pixel and each pixel of a pixel pair are aligned.

Preferably, the first pixel and each pixel of the pixel pair are vertically aligned.

Various embodiments provide, an apparatus for deinterlacing an image having a plurality of pixels, the apparatus comprising: at least one processor; and at least one memory including computer program code; the at least one memory and the computer program code being configured, with the at least one processor, to cause the apparatus to perform at least the following: calculate a difference between a first pixel of the image and each pixel of at least one pixel pair, each pixel pair comprising one pixel being positioned above the first pixel and another pixel being positioned below the first pixel; and deinterlace the first pixel only if at least one difference corresponding to a pixel pair exceeds a predefined threshold.

Various embodiments provide, a computer program product for deinterlacing an image having a plurality of pixels, the computer program product comprising at least one computer-readable storage medium having computer-executable program code instructions stored therein, the computer-executable program code instructions comprising: program code for calculating a difference between a first pixel of the image and each pixel of at least one pixel pair, each pixel pair comprising one pixel being positioned above the first pixel and another pixel being positioned below the first pixel; and program code for deinterlacing the first pixel only if at least one difference corresponding to a pixel pair exceeds a predefined threshold.

Figure 2:
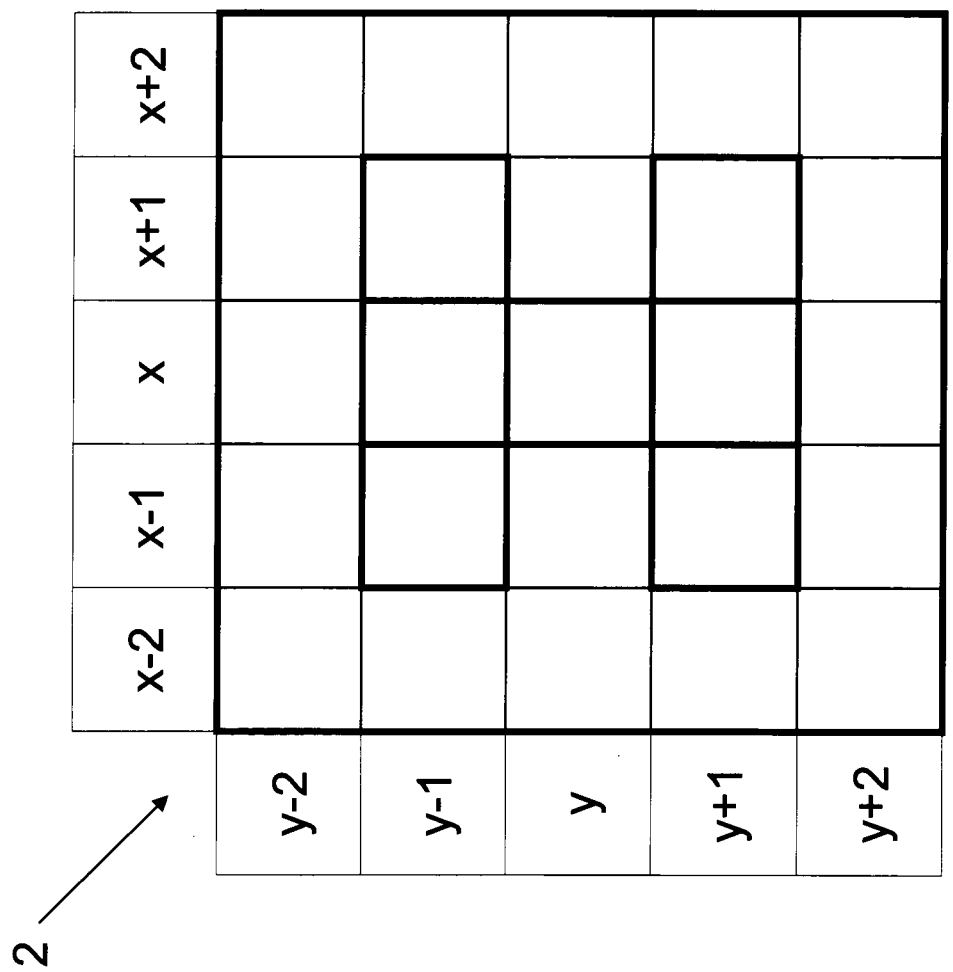
FIG. 2 illustrates an image according to an embodiment.

FIG. 2 illustrates an embodiment of an image 2 including a plurality of pixels arranged in a grid. Specifically, the image 2 includes a 5×5 grid of pixels, wherein each pixel is referenced using a coordinate system. For example, the pixel in the centre of the grid is referenced as pixel (x, y); the pixel in the top right corner of the grid is referenced as pixel (x+2, y−2); the pixel in the bottom left corner of the grid is referenced as pixel (x−2, y+2); and so on.

In an embodiment, the image 2 includes an interlaced image made up of a pair of interlacing fields. Accordingly, the following rows may form part of an even interlace field: y−2, y and y+2; whereas the following rows may form part of an odd interlace field: y−1 and y+1. It is to be understood that the image 2 will be used in the forthcoming description to illustrate the operation of various embodiments.

Figure 3:
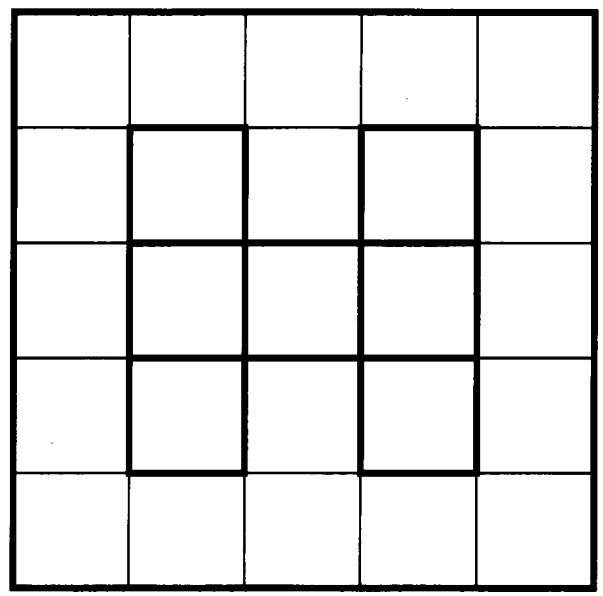
FIG. 3 illustrates two images, (a) one with interlacing artifacts and (b) the other without interlacing artifacts.
Figure 3:
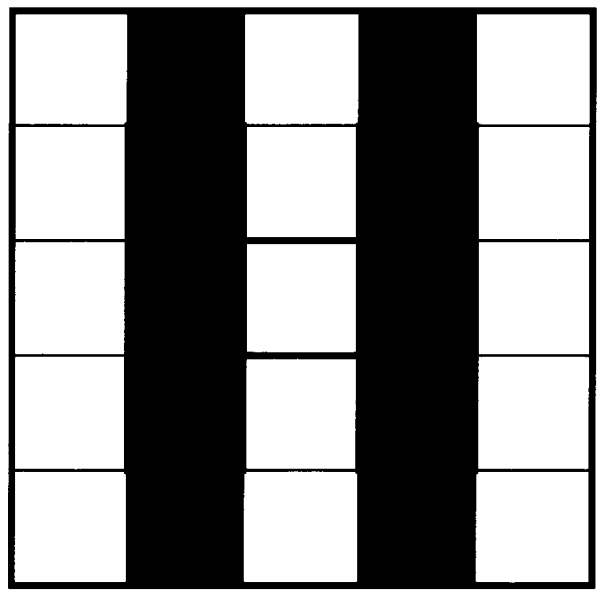

FIG. 3 illustrates the presence and absence of interlacing artifacts. FIG. 3(a) illustrates the presence of interlacing artifacts. Specifically, the even interlace field may have been captured first, whereas the odd interlace field may have been captured second. In-between capturing the even and odd fields, an object (e.g. a person) may have entered the field of view of the camera capturing the fields. Since the object was absent when the even field was captured, the pixels of the even field are clear. Conversely, since the object was present when the odd field was captured, the pixels of the odd field are shaded indicating the presence of the object. Therefore, when the even and odd fields are combined into an image, the resultant image includes a striped appearance. These stripes are the interlacing artifacts mentioned above. FIG. 3(b) illustrates the absence of interlacing artifacts. Specifically, in the case of FIG. 3(b), the above-mentioned object does not enter the camera's field of view and, therefore, both the even and odd fields do not capture the object. Accordingly, when the even and odd fields are combined to form an image, no interlacing artifacts are present.

In view of the above, interlacing artifacts may occur if the subject of the image is moving or if the camera capturing the image is moving. Accordingly, the presence of interlacing artifacts is related to the presence of motion.

Figure 4:
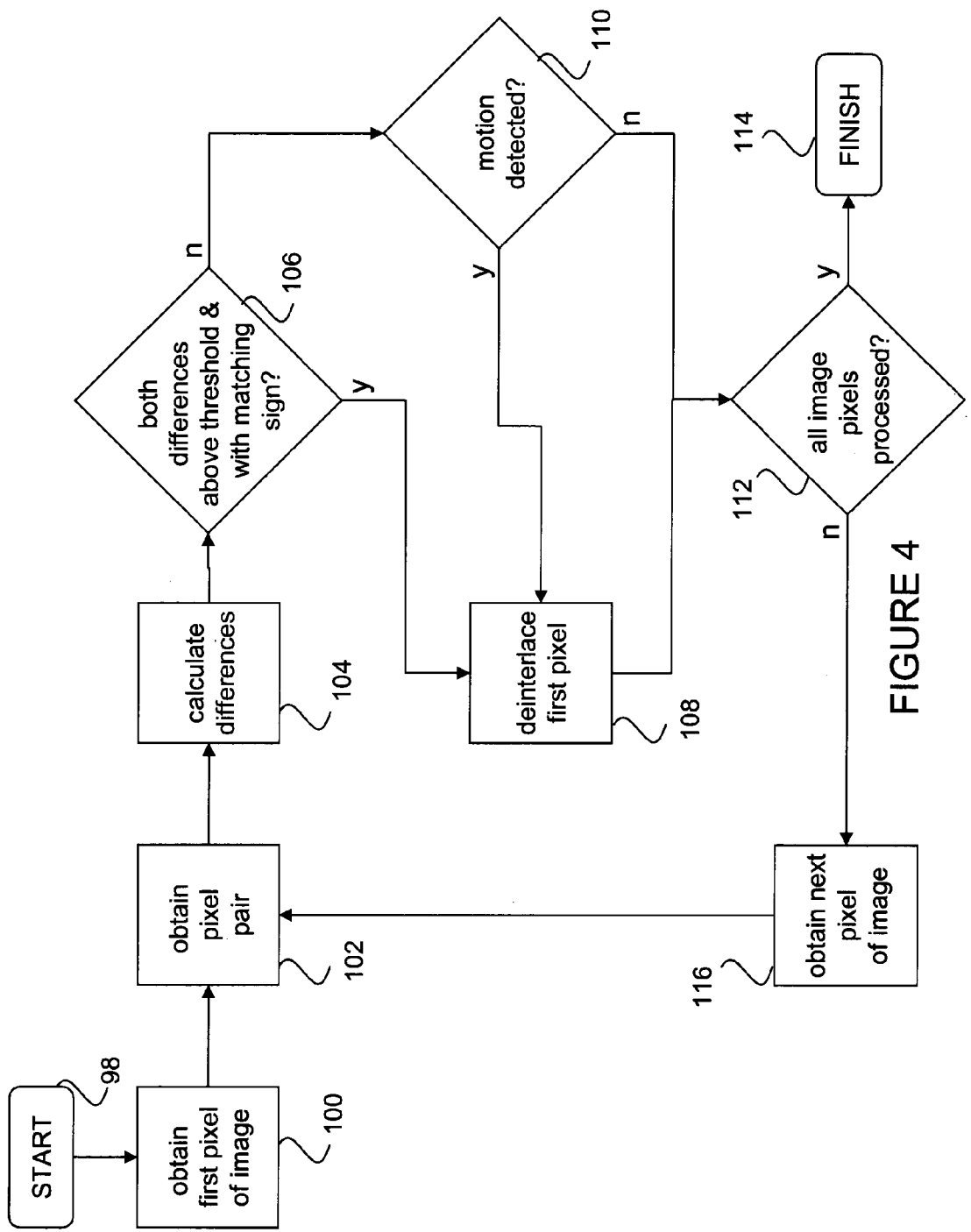
FIG. 4 illustrates a method for deinterlacing according to an embodiment.

FIG. 4 illustrates a method of interlacing according to an embodiment. The method of FIG. 4 will be described in conjunction with the image 2 of FIG. 2. The flow diagram of FIG. 4 starts at 98. At 100, a first pixel of the image 2 is obtained. In an embodiment, the first pixel is pixel (x,y). At 102, a pixel pair is obtained. The pixel pair includes a pair of pixels of the image 2. In an embodiment, each pixel of the pixel pair is adjacent the first pixel. Accordingly, each pixel of the pixel pair shares an edge and/or a corner with the first pixel. For example, the following pixels are considered adjacent to the first pixel: (x−1, y−1), (x, y−1), (x+1, y−1), (x−1, y), (x+1, y), (x−1, y+1), (x, y+1) and (x+1, y+1). Additionally, in an embodiment, a first pixel of the pixel pair is positioned above the first pixel, whereas a second pixel of the pixel pair is positioned below the first pixel. For example, the first pixel may be any one of the following pixels: (x−1, y−1), (x, y−1) and (x+1, y−1), whereas the second pixel may be any one of the following pixels: (x−1, y+1), (x, y+1) and (x+1, y+1). In an embodiment, the pixel pair obtained at 102 consists of pixel (x, y−1) and pixel (x, y+1).

At 104, the difference between the value of the first pixel and the value of each pixel of the pixel pair is calculated. In an embodiment, the value of a pixel indicates a brightness and/or a color of a pixel. For example, the image 2 may be a grayscale image and each pixel may have a value between 0 and 255, wherein 0 indicates black, 255 indicates white, and the numbers in-between indicate different shades of grey. Alternatively, the image 2 may be a color image and each pixel may include a vector of values, wherein each of the values represents an intensity of a different color component of the pixel. For example, the vector may comprise three values which represent the colors red, green and blue. Alternatively, the vector may include four values which represent the colors cyan, magenta, yellow and black. In an embodiment, where the pixel value is a vector, a difference vector comprising a plurality of difference values may be calculated. Alternatively, in an embodiment, a single difference value may be calculated by combining the vector values. It is to be understood that in the following description, reference will be made to a difference between a pixel under consideration and a pixel of a pixel pair; however, this difference may be a single value or a vector of values.

At 106, it is determined whether or not the differences calculated in 104 exceed a threshold and have matching signs. Specifically, the difference relating to the first pixel of the pixel pair is compared to a predefined threshold. Either in series or in parallel, the difference relating to the second pixel of the pixel pair is compared to the predefined threshold. If the two differences exceed the predefined threshold, the sign of each difference is compared. For example, two pixels of a pixel pair may be associated with the same difference value. Either the pixels of the pixel pair could both be different from the first pixel in the same way or they could be different from the first pixel in different ways. Considering the case where the image is a grayscale image, if both pixels of the pixel pair were associated with the same difference value, the pixels of the pixel pair may be the same color or one may be lighter than the first pixel by the same amount that the other is darker than the first pixel. In an embodiment, interlacing artifacts are detected based on whether or not both pixels of the pixel pair have the same sign, i.e. are different from the first pixel in the same or a similar way. For example, if the pixels of the pixel pair are associated with a difference exceeding the threshold but different signs, this may indicate a gradient of shading of an object rather than an interlacing artifact. Conversely if the pixels of the pixel pair are associated with a difference exceeding the threshold and the same sign, this may indicate an interlacing artifact.

According to the flow diagram of FIG. 4, if both the differences exceed the predefined threshold and have matching signs, processing flows to 108. Alternatively, if both the differences do not exceed the predefined threshold and/or have different signs, processing flows to 110.

At 108, the first pixel is deinterlaced. In an embodiment, the first pixel is deinterlaced using the pixels of the pixel pair. In an embodiment, the first pixel is deinterlaced by taking an average of the pixels of the pixel pair, for example, by summing the pixels of the pixel pair and dividing the result by two. Alternatively, the first pixel may be deinterlaced by taking an average of the pixels of the pixel pair and the first pixel. For example, the first pixel may be deinterlaced by summing each pixel of the pixel pair with twice the value of the first pixel and then dividing the result by four. In an embodiment, a weighted average may be applied. In further embodiments, one or more of the above-mentioned techniques may be applied and an average taken of the result. After deinterlacing processing flows to 112 which will be described below. It is to be understood that the multiplications and/or divisions used in determining average values may be left and right shifted to make implementation more efficient computationally.

At 110, the first pixel is analyzed to identify motion in respect of the first pixel. Although interlacing artifacts were not detected in 106, they may still be present. In an embodiment, the pixel pair obtained in 102 may only detect a certain type of artifact. For example, the pixel pair including (x, y−1) and pixel (x, y+1) may only detect artifacts on vertical edges since the pixel pair is vertically aligned with the first pixel. In another example, the pixel pair including (x−1, y−1) and pixel (x+1, y+1) may only detect artifacts on top-left to bottom-right diagonal edges.

Figure 5:
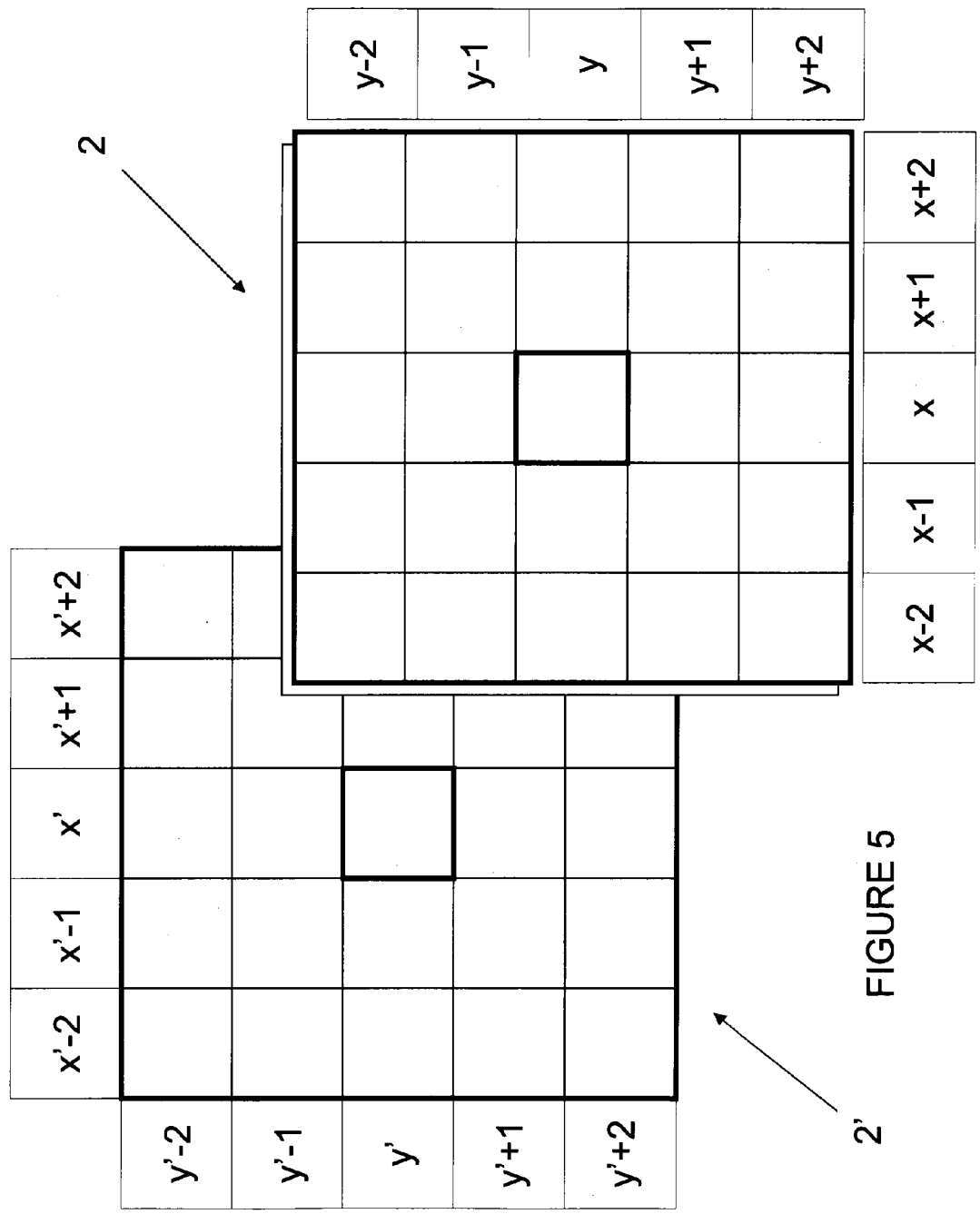
FIG. 5 illustrates two frames of a video sequence according to an embodiment.

In an embodiment, the image 2 forms a frame, or part of a frame, of a video sequence. In an embodiment, motion is detected by comparing the first pixel to one or more other pixels taken from other frames of the video sequence. For example, the first pixel may be compared to a corresponding pixel from the previous frame. FIG. 5 illustrates what is meant by corresponding pixel within the context of one embodiment.

As seen more particularly on FIG. 5, the image 2 is shown in combination with a preceding frame 2'. The structure of the image 2' is analogous to the above-described structure of image 2. The first pixel (x,y) of image 2 is indicated by a bold border. Also indicated by a bold border is pixel of image 2' which corresponds to the first pixel (x,y) of image 2. The corresponding pixel is pixel (x',y') of image 2'. Accordingly, in one embodiment, a pixel corresponding to the first pixel is a pixel of another image which has the same position within the grid of the other image as the first pixel has within the grid of the image 2. Stated differently, if the first pixel is (x,y), the corresponding pixel of another image is the pixel having the position (x,y) within that other image.

In an embodiment, motion is detected by calculating the difference between the value of the first pixel (x,y) of the image 2 and the value of the corresponding pixel (x',y') of the image 2'. If the difference is above a predefined threshold then it is considered that motion is detected in respect of the first pixel. It is to be understood that the predefined threshold relating to motion detection may be the same or different from the predefined threshold relating to artifact detection mentioned above. If motion is detected, processing moved to 108, which was discussed above. Therefore, if motion is detected, the first pixel is deinterlaced as described above. In an embodiment, deinterlacing is performed when motion is detected because motion can cause the formation of interlacing artifacts. For example, when two interlacing fields are taken on a moving subject, or when the camera capturing the two fields is moving, the image of the first field is different from the image of the second field. Therefore, when the two fields are combined together to form a frame, interlacing artifacts occur, as described above. Alternatively, if motion is not detected at 110, processing flows to 112.

In an embodiment, motion detection is performed by comparing the first pixel to a corresponding pixel of a single previous frame, such as, for example, the adjacent previous frame. However, in some other embodiments, the first pixel may be compared to one or more other frames of the video sequence. Additionally, these other frames may be before or after the image 2 in the video sequence. Also, these other frames may be adjacent to the image 2 frame or spaced from the image 2 by one or more other frames. Furthermore, the first pixel may be compared to more than one pixel from another image.

At 112, after either deinterlacing is performed or after motion is not detected, a test is performed to identify whether or not all pixels of the image 2 have been processed. If there are no remaining pixels of the image 2 to process, processing flows to 114, wherein the method finishes. Alternatively, if there are remaining pixels of image 2 to process, processing flows to 116. In the present case, only the first pixel of the image 2 has been processed. As can be seen from FIG. 2, there are more pixels of the image 2 to process. Therefore, in the present case, processing flows to 116, wherein the next pixel to process is obtained. Once the next pixel has been obtained, processing flows back to 102.

Figure 6:
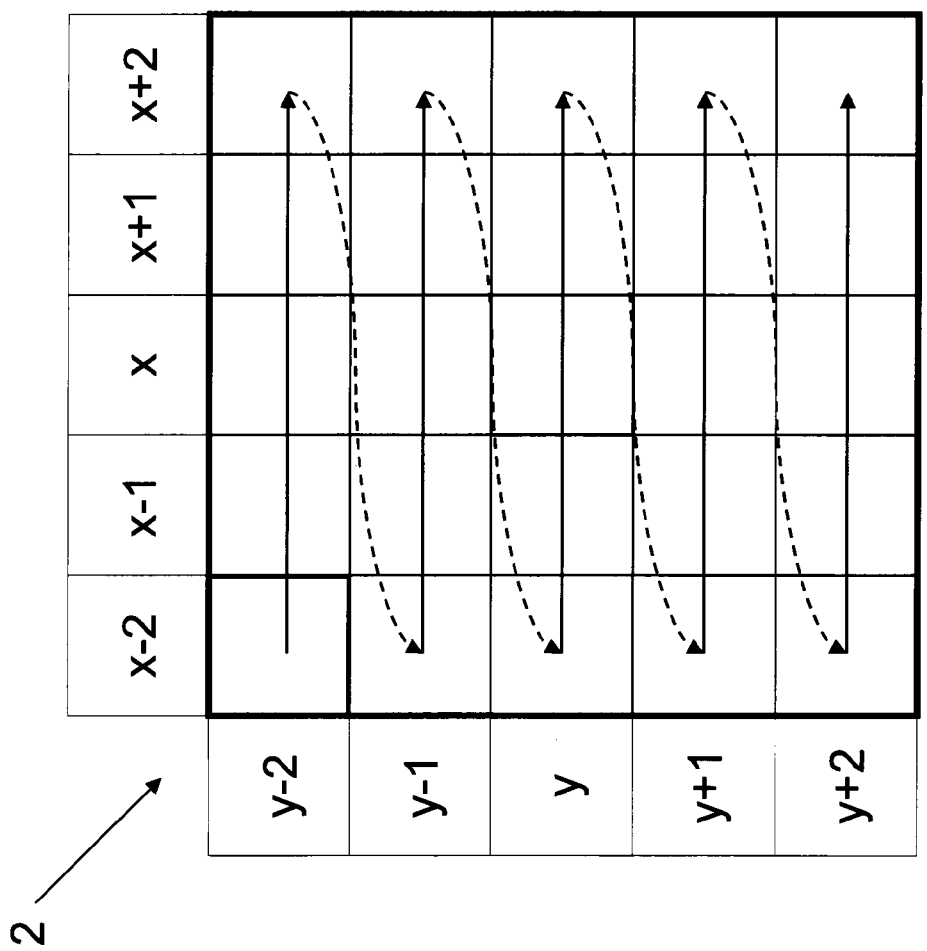
FIG. 6 illustrates one exemplary sequence for considering pixels of an image.

In an embodiment, the method is performed for each pixel in the image 2. In some embodiments, the method is only performed for one or more but not all of the image's pixels. In an embodiment, the order in which pixels of the image 2 are processed follows a spiral formation. For example, the pixels are considered in the following order: (x, y), (x+1, y), (x+1, y+1), (x, y+1), (x−1, y+1), (x−1, y), (x−1, y−1), (x, y−1), (x+1, y−1), (x+2, y−1), and so on. In another embodiment, the pixels of the image 2 are processed line by line, as seen more particularly on FIG. 6. It is to be understood that in some other embodiments the pixels may be processed in any order.

It is noted that for a pixel in the top row of image 2, i.e. row y−2, there may not be another pixel positioned above the pixel. Therefore, in some embodiments, the method is only performed for pixel rows in-between the top and bottom rows of an image, i.e. the method is not performed in respect of pixels in the top or bottom rows. In some other embodiments, the method may be performed in respect of all pixels of the image. For example, a default value may be used in place of the value of the upper or lower pixel of the pixel pair if one is not available. Alternatively, a default difference may be used in place of the difference between the upper or lower pixel and the pixel under consideration.

According to the above-described method, one or more pixels of the image 2 are processed to detect the presence of interlacing artifacts. In the event that an interlacing artifact is detected, the pixel being processed is deinterlaced. Furthermore, one or more pixels of the image 2 are processed to detect the presence of motion. In the event that motion is detected, the pixel being processed is deinterlaced. Accordingly, the method is adaptive because it adapts the performance of deinterlacing in dependence on the presence of interlacing artifacts or motion. Therefore, deinterlacing is performed in respect of pixels which do, or are likely to, contain interlacing artifacts. Stated differently, the method detects the pixels of an image in which there are interlacing artifacts and only deinterlaces those pixels. Accordingly, the perceptual visual quality of the image is improved. In various embodiments, the perceptual quality of video having motion can be improved. Also, coding efficiency of the image is improved since interlacing artifacts are reduced.

In the event that an interlacing artifact is not detected and motion is not detected, the pixel being processed is not deinterlaced. Therefore, deinterlacing is not performed in respect of pixels which do not, or are unlikely to, contain interlacing artifacts. Stated differently, pixels of an image which do not contain interlacing artifacts can be bypassed using the method. Accordingly, processing time and capacity is not wasted deinterlacing pixels which do not, or are unlikely to, contain interlacing artifacts. In this way, the above-described method can perform fast deinterlacing of a video. Furthermore, image degradation caused by deinterlacing may be reduced since image areas without interlacing artifacts are not deinterlaced.

An advantage of the above-described method may be that deinterlacing can be performed using a simple averaging technique. Stated differently, the embodiment is computationally efficient. Therefore, the method can be implemented on computing devices having relatively low processing capabilities.

In the above-described embodiment, one pixel pair was tested before motion detection was performed. However, in some other embodiments, one or more additional pixel pairs may be tested before motion detection is performed.

Figure 7:
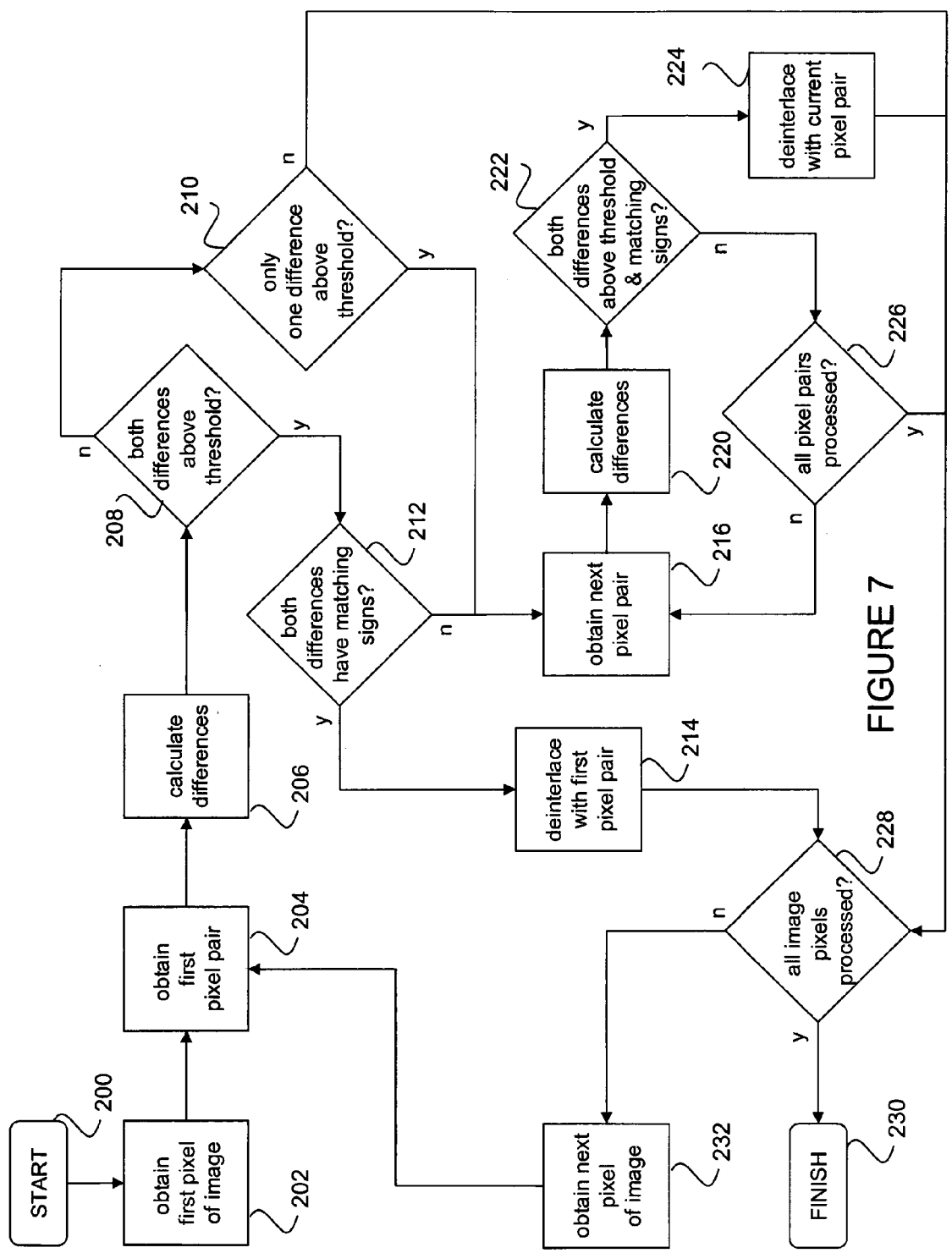
FIG. 7 illustrates a method for deinterlacing according to another embodiment.

FIG. 7 illustrates a method of interlacing according to an embodiment. The method of FIG. 7 will be described in conjunction with the image 2 of FIG. 2. The flow diagram of FIG. 7 starts at 200. At 202, a first pixel is obtained. The first pixel is as described above with reference to the flow diagram of FIG. 4. In an embodiment, the first pixel is pixel (x, y).

At 204, a first pixel pair is obtained. The general form of each pixel pair is as described above with reference to the flow diagram of FIG. 4. In an embodiment, a pixel pair and the first pixel may be aligned. In an embodiment, the alignment may be vertical, as in the case of pixel pair (x, y−1) and (x, y+1). In an embodiment, the alignment may be diagonal, as in the case of pixel pair (x−1, y−1) and (x+1, y+1) or pixel pair (x+1, y−1) and (x−1, y+1). In an embodiment, a plurality of pixel pairs may be defined and arranged in a predefined order. Accordingly, each pixel pair may be processed in order (i.e. in a prioritized fashion), as will be described below. In some other embodiments, the pixel pairs may not be in any particular order and each pixel pair may be processed in any order.

In the present embodiment, the following three pixel pairs are defined: a first pixel pair of (x, y−1) and (x, y+1), a second pixel pair of (x−1, y−1) and (x+1, y+1), and a third pixel pair of (x+1, y−1) and (x−1, y+1). According to the present embodiment, the first pixel pair is ordered first, followed by the second pixel pair, followed by the third pixel pair. Therefore, at 204, the first pixel pair of (x, y−1) and (x, y+1) is obtained.

At 206, differences between the value of the first pixel and each pixel of the pixel pair are calculated. This process is analogous to 104 of FIG. 4. At 208, a test is performed to determine whether or not both differences calculated in 206 are above a predefined threshold. This predefined threshold may be the same or different from the predefined threshold of 106 of FIG. 4. If both calculated differences are not above the threshold, processing flows to 210, which will be described later. If both calculated differences are above the threshold, processing flows to 212.

At 212, a further test is performed to determine whether or not both calculated differences have matching signs. The combination of 208 and 212 is analogous to 106 of FIG. 4. If both calculated differences have the same sign, processing flows to 214, wherein the first pixel is deinterlaced using the first pixel pair in an analogous way to 108 in FIG. 4. Alternatively, if both calculated differences do not have the same sign, processing flows to 216.

At 216, the next pixel pair is obtained. In the present embodiment, the next pixel pair to be processed is the second pixel pair. However, in other embodiments, the order may be different or there may be no order. At 220, the differences relating to the second pixel pair are calculated. This process is analogous to that of 206 and 104 of FIG. 4. At 222, a test is performed to determine whether or not both differences relating to the second pixel pair are above a predefined threshold and have matching signs. This predefined threshold may be the same as, or different to, the threshold relating to 208 or 106 of FIG. 4. This operation is analogous to that of 106 of FIG. 4. If both the calculated differences relating to the second pixel pair exceed the threshold and have matching signs, processing flows to 224, wherein the first pixel is deinterlaced using the second pixel pair in an analogous way to 108 in FIG.

4. Alternatively, if both the calculated differences relating to the second pixel pair do not exceed the threshold and have matching signs, processing flows to 226. At 226, a test is performed to determine whether or not all pixel pairs have been processed. If all pixel pairs have been processed, processing flows to 228, otherwise processing flows back to 216. In the present embodiment, three pixel pairs are defined. Therefore, one pixel pair (the third pixel pair) has not yet been processed. Accordingly, processing flows back to 216 wherein the processing loop defined by 216, 220, 222 and 224 or 226 is performed again, but this time in respect of the third pixel pair.

As mentioned above, at 208, if both differences calculated in respect of the first pixel pair are not above the threshold, processing flows to 210. At 210, a test is performed to determine whether or not one of the calculated differences is above the threshold. If only one of the calculated differences is above the threshold, processing flows to 216. However, if neither of the calculated differences is above the threshold, processing flows to 228. Processing from 216 is as described above.

Processing may flow to 228 from 214, 224, 226 or 210 mentioned above. At 228, a pixel being processed has either been deinterlaced or not deinterlaced in dependence on whether or not an interlacing artifact has been detected in respect of the pixel. At 228, a test is performed to determine whether or not all pixels in the image have been processed, in an analogous way to 112 of FIG. 4. If all pixels have been processed, processing flows to 230, wherein the method finishes. Alternatively, if there are still pixels to be processed, processing flows to 232. At 232, the next pixel is obtained in an analogous way to 116 of FIG. 4. Once the next pixel has been obtained processing flows back to 204, wherein the method continues as described above.

The following represents pseudo-code for performing the above-described embodiment of FIG. 7. In the pseudo-code, 'X' represents pixel (x, y); 'A' represents pixel (x, y−1); 'B' represents pixel (x, y+1); 'C' represents pixel (x−1, y−1); 'D' represents pixel (x+1, y+1); 'E' represents pixel (x+1, y−1); 'F' represents pixel (x−1, y+1); and, 'th' represents a predefined threshold.

```
if(|X−A|>= th and |X−B|>=th)
  {
  if(sign(X−A) = sign(X−B))
     deinterlace X with A and B
     else if((|X−C|>= th and |X−D|>=th) and (sign(X−C) = sign(X−D)))
     deinterlace X with C and D
     else if((|X−E|>= th and |X−F|>=th) and (sign(X−E) = sign(X−F)))
     deinterlace X with E and F
     else
     bypass
  }
else if(|X−A| >= th or |X−B|>=th)
  {
  if (((|X−C|>= th and |X−D|>=th) and (sign(X−C) = sign(X−D)))
     deinterlace X with C and D
     else if (((|X−E|>= th and |X−F|>=th) and (sign(X−E) = sign(X−F)))
     deinterlace X with E and F
     else
     bypass
  }
else
  bypass
```

The above comments stated in respect of the embodiment of FIG. 4 and regarding processing one or more pixels of the image and regarding processing of pixels in the top and bottom pixel rows apply equally to the embodiment of FIG. 7.

According to the above-described method, one or more pixels of the image 2 are processed to detect the presence of interlacing artifacts. In the event that an interlacing artifact is detected, the pixel being processed is deinterlaced. Accordingly, the method is adaptive because it adapts the performance of deinterlacing in dependence on the presence of interlacing artifacts. Therefore, deinterlacing is performed in respect of pixels which do, or are likely to, contain interlacing artifacts. Stated differently, the method detects the pixels of an image in which there are interlacing artifacts and only deinterlaces those pixels. Accordingly, the perceptual visual quality of the image is improved. In various embodiments, the perceptual quality of video having motion can be improved. Also, coding efficiency of the image is improved since interlacing artifacts are removed.

Furthermore, the above-described method is adaptive because it can adapt the amount of artifact detection performed in dependence on the noticeability of artifacts. For example, if an artifact is detected using the first pixel pair, no further detection is performed. Otherwise, the second pixel pair is used for artifact detection. Again, if an artifact is detected then no further detection is performed. Otherwise, the third pixel pair is used for artifact detection, and so on. Accordingly, the amount of processing involved in detecting an artifact is adaptive to how noticeable the artifact is. This is achieved by prioritizing the use of some pixel pairs over the use of other pixel pairs. Specifically, pixel pairs may be prioritized based on the type of interlacing artifact they are suited to detecting. For example, a pixel pair suited to detecting an interlacing artifact on a vertical edge (the first pixel pair) may be prioritized over a pixel pair suited to detecting an interlacing artifact on a diagonal edge (the second or third pixel pairs). This may be because artifacts on vertical edges may be more noticeable than those on diagonal edges. Furthermore, a pixel pair suited to detecting an interlacing artifact on a top-left to bottom-right diagonal edge (the second pixel pair) may be prioritized over a pixel pair suited to detecting an interlacing artifact on a top-right to bottom-left diagonal edge (the third pixel pair). This may be because artifacts on top-left to bottom-right diagonal edges may be more noticeable than those on top-right to bottom-left diagonal edges. Therefore, certain pixel pairs are prioritized over other pixel pairs because they are better at detecting more noticeable interlacing artifacts. Accordingly, unnecessary checking can be avoided.

A further advantage of the above-described method may be that multiple pixel pairs may be processed. Furthermore, multiple pixel pairs may be assigned a particular order and they may be processed in accordance with that order. For example, a vertically aligned pixel pair (e.g. the first pixel pair) may be particularly effective at detecting interlacing artifacts on vertical or near vertical edges. However, a diagonally aligned pixel pair (e.g. the second or third pixel pair) may be particularly effective at detecting interlacing artifacts on diagonal or near diagonal edges. Therefore, it may be advantageous to process both a vertically aligned pixel pair and a diagonally aligned pixel pair.

In the event that an interlacing artifact is not detected, the pixel being processed is not deinterlaced. Therefore, deinterlacing is not performed in respect of pixels which do not, or are unlikely to, contain interlacing artifacts. Stated differently, areas of an image which do not contain interlacing artifacts can be bypassed using the method. Accordingly, processing time and capacity is not wasted deinterlacing pixels which do not, or are unlikely to, contain interlacing artifacts. For example, unnecessary processing of static or homogeneous image portions can be avoided. In this way, the above-described method can perform fast deinterlacing of video. Furthermore, image degradation caused by deinterlacing may be reduced since image areas without interlacing artifacts are not deinterlaced.

An advantage of the above-described embodiment may be that deinterlacing can be performed using a simple averaging technique. Stated differently, the embodiment is computationally efficient. Therefore, the embodiment can be implemented on computing devices having relatively low processing capabilities.

It is to be understood that one or more features of the embodiment of FIG. 4 may be combined with one or more features of the embodiment of FIG. 7 to form further embodiments. For example, motion detection may be added to the embodiment of FIG. 7. Additionally or alternatively, artifact detection based on a plurality of pixel pairs, or a prioritized list of pixels pairs, may be added to the embodiment of FIG. 4.

A first set of experiments were conducted on seven 704× 576 (4CIF) resolution test sequences in order to evaluate the performance of the embodiment described above with reference to FIG. 4. These test sequences are commonly used in video de-interlacing research and include: Mobile, Shields and Michael Schumacher. Furthermore, three 4CIF video sequences were captured using a Panasonic BB-MCH581 camera for use as test sequences. All sequences have various visually detectable interlacing artifacts. In the evaluation, parts of a test sequence containing interlacing artifacts are compared with corresponding deinterlaced versions. FIGS. 8 to 13 illustrate the results of the first set of experiments.

There is no definitive way of evaluating the performance of a deinterlacing method; however, it is possible to make subjective evaluations based on improvements in visual quality. In summary, the embodiment under test removes almost all of the visually detectable interlacing artifacts thereby improving image quality. Also, the embodiment bypasses static areas of the images thereby maintaining visual quality and reducing unnecessary processing.

In the experiment, the embodiment is compared against the following five conventional deinterlacing algorithms: line averaging (LA), line doubling (LD), vertical temporal median filtering (VTMed), spatio-temporal edge-based median filtering (STMed) and edge-based line averaging (ELA). The average processing time for each algorithm over all test sequences is specified in FIG. 14. As can be seen from FIG. 14, the embodiment under test is much faster than ELA, VTMed and STMed, but is a little slower than the most simplest algorithms, LA and LD. All the algorithms are implemented in C code, running on 2.4 GHz CPU machine for this experiment.

Figure 8:
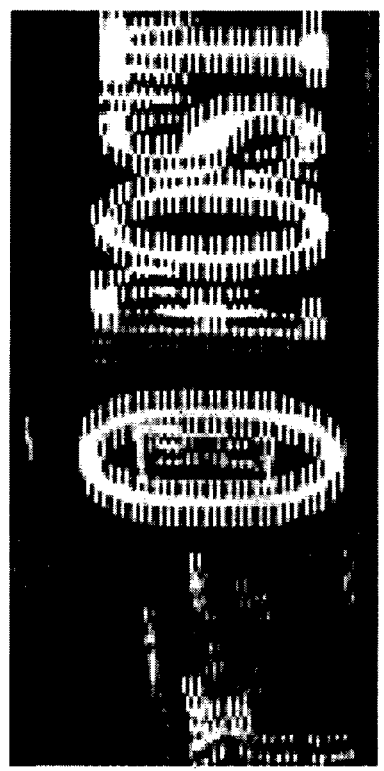
Figure 8:
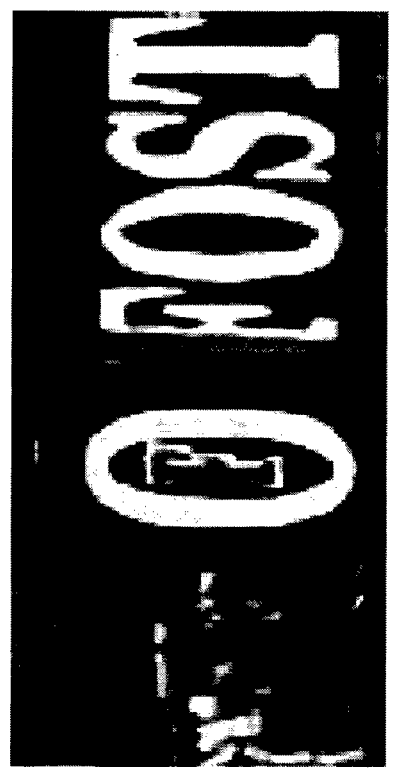

FIG. 8 shows the differences between (a) an LA deinterlacing method and (b) the embodiment under test. LA and the embodiment under test include a similar algorithm except that LA performs deinterlacing for the whole frame. On the other hand, the embodiment indentifies areas of the frame with interlacing artifacts and performs deinterlacing on only the identified areas. As can be seen, the embodiment provides better deinterlacing results on moving diagonal edges and the embodiment better preserves horizontal edges on static areas.

Figure 9:

FIG. 9 shows the differences between (a) an LD deinterlacing method and (b) the embodiment under test. LD provides a simple and fast algorithm. As seen more particularly on FIG. 9, the LD algorithm introduces artifacts on edges which are not introduced by the embodiment. Accordingly, the embodiment better preserves edges.

Figure 10:
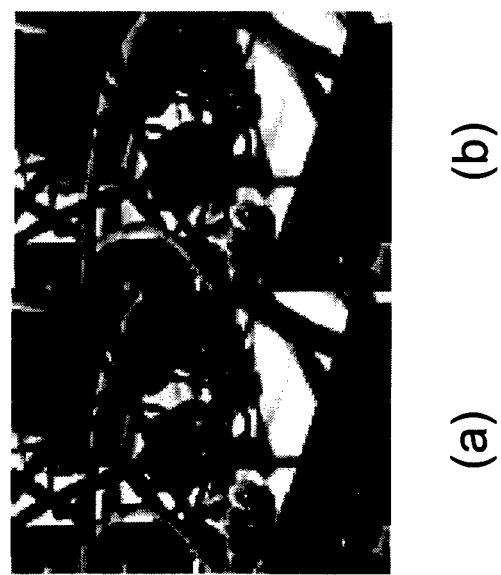
Figure 13:
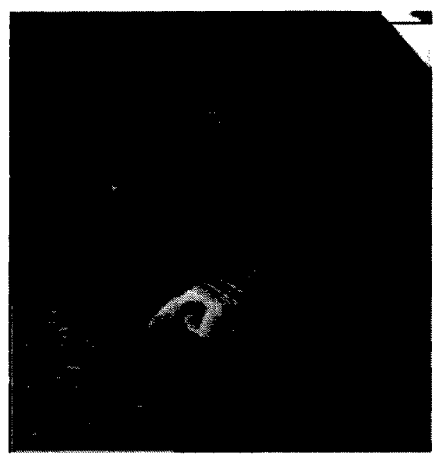
Figure 13:
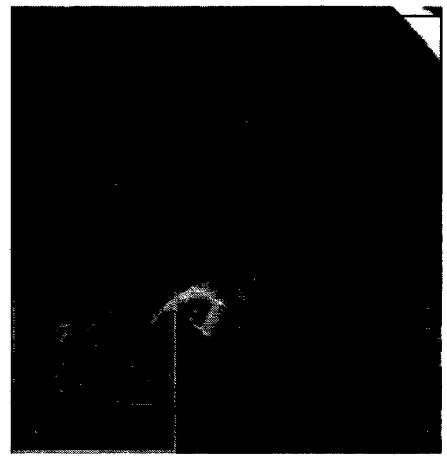

FIG. 10 shows the differences between (a) a VTMed algorithm and (b) the embodiment under test. The embodiment can be seen to reduce more interlacing artifacts from moving areas. It is also noted that the embodiment is 34% faster than VTMed.

Figure 11:

FIG. 11 shows the difference between (a) an STMed algorithm and (b) the embodiment under test. While both the embodiment and STMed reduce interlacing artifacts effectively, the embodiment operates 64.7% faster than STMed. Additionally, STMed appears to introduce some flickering artifacts in some strong texture areas which are not introduced by the embodiment.

Figure 12:
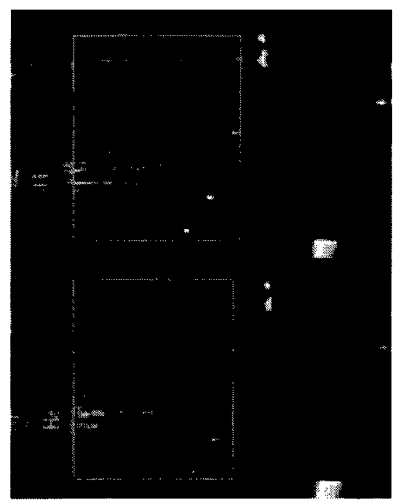

FIG. 12 shows the difference between (a) an ELA algorithm and (b) the embodiment under test. ELA appears to perform better on some diagonal edges; however, ELA seems to cause content detail loss in some texture areas and tends to introduce flickering artifacts, where the embodiment does not. It is also noted that the embodiment runs 34% faster than ELA.

In view of the above, a subjective evaluation performed by viewing the example videos shows that the embodiment under test can reduce interlacing artifacts from most parts of the video and can yield better overall visual quality compared to the other algorithms.

In a second set of experiments, a performance evaluation was performed for the embodiment described above with reference to FIG. 7.

A standard interlacing test video sequence called 'shields' was used. In summary, the embodiment removed most of the visible interlacing artifacts. Additionally, visible distortions not only on the vertical edges but also on most of the diagonal edges were removed. An improvement of the embodiment over known line average algorithms is that deinterlacing is only performed in respect of image parts having interlacing artifacts, thereby reducing the amount of unnecessary averaging performed.

Figure 15:
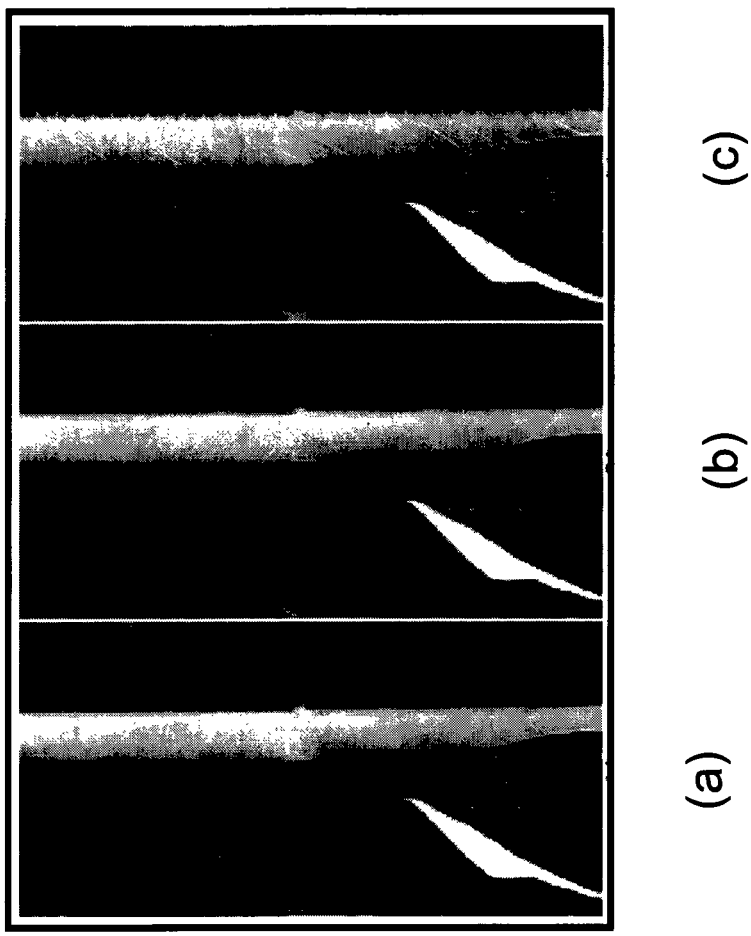
FIG. 15 illustrates simulation results relating to a second set of experiments.

FIG. 15 illustrates the results of the second set of experiments, wherein (a) illustrates the embodiment under test, (b) illustrates a known line averaging algorithm, and (c) illustrates the original frame before deinterlacing. In FIG. 15, small details on the pale column behind the man in the image are better preserved with the embodiment under test. This is because the embodiment reduces unnecessary deinterlacing, i.e. it does not deinterlace parts of the image without interlacing artifacts. The embodiment is capable of operating in this way because the embodiment can distinguish candidate pixels with interlacing artifacts from candidate pixels without interlacing artifacts. For example, in static scenes, there may be almost no visible interlacing artifacts. Accordingly, the embodiment can bypass these candidate pixels without interlacing artifacts to maintain video quality.

Some embodiments provide an efficient, simple and adaptive deinterlacing algorithm which determines whether discernable interlacing visual artifacts occur around a candidate pixel before actually performing deinterlacing in respect of the candidate pixel. In some embodiments, deinterlacing is carried out only for a candidate pixel assumed to have artifacts on its surroundings. Accordingly, unnecessary averaging or deinterlacing performed by current line averaging methods may be reduced.

In an embodiment, the image may include more or less than 5×5 pixels. In an embodiment, the height and width of the image may be different; for example, the height may be greater than or less than the width. In an embodiment, each pixel may be a shape other than a square; for example, each pixel may have rectangular shape or a triangular shape. In an embodiment, the image may be an image portion of a larger image. In an embodiment, the image may be a frame, or part of a frame, of a video sequence.

In an embodiment, the image may comprise a plurality of pixels which are not aligned vertically and/or horizontally. For example, the pixels of a row and/or a column may be offset from the pixels of an adjacent row and/or a column. In some further embodiments, the pixels may not form a grid. Accordingly, the plurality of pixels of the image may be arranged in any formation, such as, for example, a circular formation or an irregularly shaped formation. Furthermore, in the above-described embodiments, the image comprises a plurality of pixels in a two-dimensional formation. In some other embodiments, the plurality of pixels may be arranged in a different formation, such as, for example, a three-dimensional formation.

In the above-described embodiments, each pixel pair comprises two pixels which are adjacent to the candidate pixel (e.g. the first pixel). However, it is to be understood that in some other embodiments, one or more of the pixels of one or more pixel pairs may be spaced from the candidate pixel by one or more pixels. For example, a pixel pair may be vertically aligned with the candidate pixel but may comprise a pixel which is spaced from the candidate pixel by one pixel. In another example, a pixel pair may be diagonally aligned with the candidate pixel but may comprise one pixel which is spaced from the candidate pixel by two pixels and another pixel which is spaced from the candidate pixel by one pixel.

In the above-described embodiments, a candidate pixel is compared to each of a pair of pixels to detect interlacing artifacts. However, in some other embodiments, the candidate pixel may be compared to only one other pixel or more than two other pixels to detect interlacing artifacts.

Figure 16:
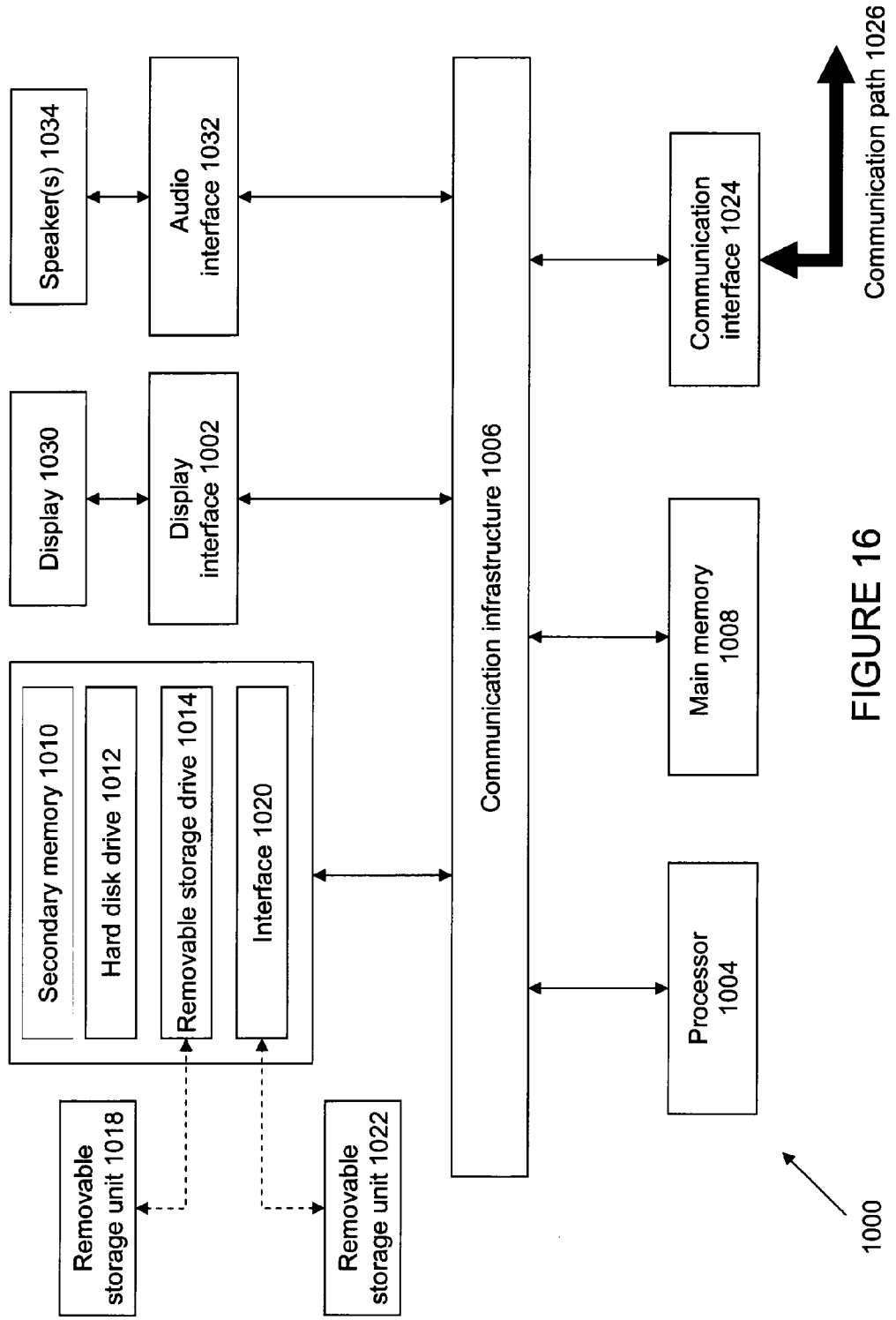
FIG. 16 illustrates a computing device according to an embodiment.

FIG. 16 depicts an example computing device 1000 that may be utilized to implement a method for deinterlacing an image according to an embodiment. In an embodiment, the computing device 1000 is an apparatus for deinterlacing an image. The following description of computing device 1000 is provided by way of example only and is not intended to be limiting.

As shown in FIG. 16, example computing device 1000 includes a processor 1004 for executing software routines. Although a single processor is shown for the sake of clarity, computing device 1000 may also include a multi-processor system. Processor 1004 is connected to a communication infrastructure 1006 for communication with other components of computing device 1000. Communication infrastructure 1006 may include, for example, a communications bus, cross-bar, or network.

Computing device 1000 further includes a main memory 1008, such as a random access memory (RAM), and a secondary memory 1010. Secondary memory 1010 may include, for example, a hard disk drive 1012 and/or a removable storage drive 1014, which may include a floppy disk drive, a magnetic tape drive, an optical disk drive, or the like. Removable storage drive 1014 reads from and/or writes to a removable storage unit 1018 in a well known manner. Removable storage unit 1018 may include a floppy disk, magnetic tape, optical disk, or the like, which is read by and written to by removable storage drive 1014. As will be appreciated by persons skilled in the relevant art(s), removable storage unit 1018 includes a computer readable storage medium having stored therein computer executable program code instructions and/or data.

In an alternative implementation, secondary memory 1010 may include other similar means for allowing computer programs or other instructions to be loaded into computing device 1000. Such means can include, for example, a removable storage unit 1022 and an interface 1020. Examples of a removable storage unit 1022 and interface 1020 include a program cartridge and cartridge interface (such as that found in video game console devices), a removable memory chip (such as an EPROM or PROM) and associated socket, and other removable storage units 1022 and interfaces 1020 which allow software and data to be transferred from the removable storage unit 1022 to computer system 1000.

Computing device 1000 also includes at least one communication interface 1024. Communication interface 1024 allows software and data to be transferred between computing device 1000 and external devices via a communication path 1026. In various embodiments, communication interface 1024 permits data to be transferred between computing device 1000 and a data communication network, such as a public data or private data communication network. Examples of communication interface 1024 can include a modem, a network interface (such as Ethernet card), a communication port, and the like. Software and data transferred via communication interface 1024 are in the form of signals which can be electronic, electromagnetic, optical or other signals capable of being received by communication interface 1024. These signals are provided to the communication interface via communication path 1026.

As shown in FIG. 16, computing device 1000 further includes a display interface 1002 which performs operations for rendering images to an associated display 1030 and an audio interface 1032 for performing operations for playing audio content via associated speaker(s) 1034.

As used herein, the term "computer program product" may refer, in part, to removable storage unit 1018, removable storage unit 1022, a hard disk installed in hard disk drive 1012, or a carrier wave carrying software over communication path 1026 (wireless link or cable) to communication interface 1024. A computer readable medium can include magnetic media, optical media, or other recordable media, or media that transmits a carrier wave or other signal. These computer program products are devices for providing software to computer system 1000.

Computer programs (also called computer program code) are stored in main memory 1008 and/or secondary memory 1010. Computer programs can also be received via communication interface 1024. Such computer programs, when executed, enable the computing device 1000 to perform one or more features of embodiments discussed herein. In various embodiments, the computer programs, when executed, enable the processor 1004 to perform features of the above-described methods for deinterlacing an image. Accordingly, such computer programs represent controllers of the computer system 1000.

Software may be stored in a computer program product and loaded into computing device 1000 using removable storage drive 1014, hard disk drive 1012, or interface 1020. Alternatively, the computer program product may be downloaded to computer system 1000 over communications path 1026. The software, when executed by the processor 1004, causes the processor 1004 to perform functions of embodiments described herein.

It is to be understood that the embodiment of FIG. 16 is presented merely by way of example. Therefore, in some embodiments one or more features of the computing device 1000 may be omitted. Also, in some embodiments, one or more features of the computing device 1000 may be combined together. Additionally, in some embodiments, one or more features of the computing device 1000 may be split into one or more component parts.

It has been particularly shown and described with reference to specific example embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for deinterlacing an image having a plurality of pixels, the method comprising:
    calculating a difference between a first pixel of the image and each pixel of at least one pixel pair, each pixel pair comprising one pixel being positioned above the first pixel and another pixel being positioned below the first pixel; and
    deinterlacing the first pixel only if at least one difference corresponding to a pixel pair exceeds a predefined threshold,
    wherein the at least one pixel pair comprises a plurality of pixel pairs, the plurality of pixel pairs having a predefined order, and the method being performed in respect of each pixel pair sequentially and in accordance with the predefined order.

2. The method of claim 1, wherein the first pixel is deinterlaced only if both differences corresponding to the pixel pair exceed the predefined threshold.

3. The method of claim 2, wherein the first pixel is deinterlaced only if both differences corresponding to the pixel pair exceed the predefined threshold and have matching signs.

4. The method of claim 1, wherein the first pixel is deinterlaced only if both differences corresponding to another pixel pair exceed the predefined threshold and have matching signs.

5. The method of claim 3, wherein deinterlacing comprises setting the first pixel to equal an average value, the average value being calculated using both differences which exceed the predefined threshold and have matching signs.

6. The method of claim 1, wherein, according to the predefined order, the method is performed in respect of a pixel pair which is vertically aligned with the first pixel before the method is performed in respect of a pixel pair which is diagonally aligned with the first pixel.

7. The method of claim 1, wherein the image is a frame of a video and, if deinterlacing is not performed, the method further comprises:
    detecting motion in respect of the first pixel by comparing the first pixel with a corresponding pixel of at least one other frame of the video; and
    deinterlacing the first pixel only if motion is detected in respect of the first pixel.

8. The method of claim 7, wherein motion is detected if a difference between the first pixel and the corresponding pixel of the at least one other frame exceeds a second predefined threshold.

9. The method of claim 1, wherein at least one pixel of a pixel pair is positioned adjacent to the first pixel.

10. The method of claim 1, wherein the first pixel and each pixel of a pixel pair are aligned.

11. The method of claim 10, wherein the first pixel and each pixel of the pixel pair are vertically aligned.

12. An apparatus for deinterlacing an image having a plurality of pixels, the apparatus comprising:
    at least one processor; and
    at least one memory including computer program code;
    the at least one memory and the computer program code being configured, with the at least one processor, to cause the apparatus to perform a method comprising:
    calculating a difference between a first pixel of the image and each pixel of at least one pixel pair, each pixel pair comprising one pixel being positioned above the first pixel and another pixel being positioned below the first pixel; and
    deinterlacing the first pixel only if at least one difference corresponding to a pixel pair exceeds a predefined threshold,
    wherein the at least one pixel pair comprises a plurality of pixel pairs, the plurality of pixel pairs having a predefined order, and the method being performed in respect of each pixel pair sequentially and in accordance with the predefined order.

13. A computer program product for deinterlacing an image having a plurality of pixels, the computer program product comprising at least one non-transitory computer-readable storage medium having computer-executable program code instructions stored therein, the computer-executable program code instructions executable by a computer processor to perform a method comprising:
    calculating a difference between a first pixel of the image and each pixel of at least one pixel pair, each pixel pair comprising one pixel being positioned above the first pixel and another pixel being positioned below the first pixel; and
    deinterlacing the first pixel only if at least one difference corresponding to a pixel pair exceeds a predefined threshold,
    wherein the at least one pixel pair comprises a plurality of pixel pairs, the plurality of pixel pairs having a predefined order, and the method being performed in respect of each pixel pair sequentially and in accordance with the predefined order.

14. The method of claim 4, wherein deinterlacing comprises setting the first pixel to equal an average value, the average value being calculated using both differences which exceed the predefined threshold and have matching signs.

* * * * *